UNITED STATES PATENT OFFICE 2,500,856

ALIPHATIC ESTERS OF 3,4-BIS-(m-METHYL-p-HYDROXYPHENYL)-2,4-HEXADIENE

Victor Niederl, Round Top, N. Y., and Albert Bloom, Summit, N. J., assignors to Reed & Carnrick, Jersey City, N. J., a corporation of New Jersey No Drawing. Application December 17, 1946, Serial No. 716,884

4 Claims. (Cl. 260—479)

The present invention relates to certain esters of dialkyldihydroxydiphenylhexadiene, wherein the acid radical contains 2 to 4 carbon atoms.

More specifically, the present invention relates to saturated aliphatic carboxylic acid esters of 3,4 - bis - (m - methyl - p - hydroxyphenyl) - 2,4-hexadiene containing 2 to 4 carbon atoms in the carboxylic acid radicals.

This application is a continuation-in-part of application Serial No. 524,090, filed February 26, 1944, now Patent No. 2,419,516, dated April 22, 1947, and 696,050, filed September 10, 1946.

It is an object of this invention to provide a number of new estrogenic compounds of high estrogenic activity and low toxicity.

It is a special object of this invention to produce certain estrogenic substances which, because of their high estrogenic activity and low toxicity, exhibit and possess very favorable therapeutic indices; and which, additionally, possess special physiological characteristics making them very suitable for oral administration in the treatment of the menopausal syndrome.

Other objects of this invention will be apparent from the more detailed disclosures which follow.

In its special and broader aspects, the process of this invention may be considered to involve (A) reacting cresol or other alkylhydroxyphenyl compounds with propionyl chloride or propionic acid anhydride, thereby producing a propionate of the hydroxy compound; (B) subjecting the said propionate to the Fries rearrangement, thereby producing an alkyl-p-hydroxypropiophenone usually admixed with a quantity of the corresponding o-hydroxy compound; (C) esterifying the said mixture of alkylhydroxypropiophenones with a suitable organic esterifying reagent, and then fractionally distilling the reaction product under reduced pressure to separate the ortho and paraacyloxy derivatives; (D) pinacolizing the alkyl-p-acyloxyphenone by slowly introducing water into an isopropyl ether solution of the same in the presence of amalgamated aluminum, thereby producing a 3,4-bis-(alkyl-p-acyloxyphenyl)-3,4 - hexanediol; and (E) converting the hexanediol structure of the last mentioned compound to a hexadiene structure by dehydrating the same with a mixture of acetic acid anhydride and acetyl chloride, thereby forming a 3,4-bis-(alkyl-p-acyloxyphenyl)-2,4-hexadiene.

The esters of 3,4-bis-(alkyl-p-hydroxyphenyl)-2,4-hexadiene may also be produced by appropriate saponification of a 3,4-bis-(alkyl-p-acyloxyphenyl)-2,4-hexadiene to the corresponding 3,4-bis-(alkyl-p-hydroxyphenyl)-2,4-hexadiene, and then reacting either or both of the phenolic hydroxyl groups with the desired acylating reagent by various esterifying methods known to the art.

Collectively the preferred estrogenic compounds of this invention may be referred to by the following formula:

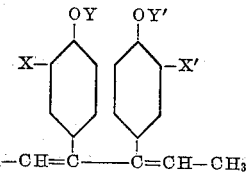

wherein X and X' are methyl groups, and at least one Y is an acyl radical derived from a saturated aliphatic carboxylic acid of 2 to 4 carbon atoms, and the other Y is a hydrogen or the same or a different acyl radical. In the simpler and more easily produced compounds, Y and Y' represent the same acyl radical. From the above formula it is obvious that the methyl groups X and X' and the acyl radicals Y and Y' may have their positions designated as 3' and 4', respectively, or as meta (m) and para (p), respectively. It will be understood that reference herein to saturated aliphatic carboxylic acid esters of 3,4-bis-(m-methyl-p-hydroxyphenyl)-2,4-hexadiene containing from 2 to 4 carbon atoms in the carboxylic acid radical refers to all types of esters included in the illustrative formula.

Example 1

A. Molar quantities of o-cresol and propionyl chloride are allowed to react in a suitable container, forming, with elimination of hydrogen chloride, the o-methylphenyl propionate in quantitative yield. The reaction product may be used for the next step without further purification.

B. Thirty grams of the above crude o-methylphenyl propionate is dissolved in 100 milliliters of dry nitrobenzene and chilled in an ice bath after which 35 grams of anhydrous aluminum chloride is added in small portions. The reaction mixture is kept cold during the addition of aluminum chloride, after which it is left standing in an ice bath for several hours and then at room temperature overnight. Thereafter, the reaction mixture is decomposed with ice water, a few milliliters of hydrochloric acid are added, and the reaction mixture is extracted with ether. The nitrobenzene-ether solution is washed with water and then extracted with 10 per cent sodium hydroxide solution. Finely crushed ice is added to this alkali solution which is then acidified with hydrochloric acid. The precipitate formed is collected and subjected to steam distillation to remove the ortho isomer. The remaining m-methyl-p-hydroxypropiophenone may be used for the next reaction without further purification.

C. Twenty grams of the above ketone is added to 40 grams of amalgamated aluminum foil covered with one liter of moist ether and refluxed for several hours. After standing overnight, the reaction mixture is filtered, and the residual magma is washed well with ether. The ether solutions are combined and concentrated by removing most of the ether, after which the residue is placed in the refrigerator for several days to allow it to solidify. The crystalline product is then collected and washed with a small portion of cold acetic acid. After recrystallization from ethanol the 3,4-bis-(m-methyl-p-hydroxyphenyl)-3,4-dihydroxyhexane melts at 182 to 183° C.

D. Five grams of the above glycol is suspended in 15 milliliters of acetic acid anhydride, and 10 milliliters of acetyl chloride is added. The flask is placed in a water bath which is gradually heated to 70° C., and heating at this temperature is continued for about twenty minutes. The flask is chilled, and the reaction mixture is treated with finely crushed ice. The precipitate obtained is recrystallized from ethanol, and then the 3,4-bis-(m-methyl-p-acetoxyphenyl)-2,4-hexadiene has a melting point of 166 to 168° C. The 3,4-bis-(m-methyl-p-acetoxyphenyl)-2,4-hexadiene produces 63% estrus in ovariectomized rats when given orally in a dosage of 15 gammas.

*Example 2*

A. One mol of o-cresol and 1.05 mols of propionic acid anhydride are placed in a suitable reaction vessel provided with a reflux condenser. The mixture is then heated to the point of reflux and allowed to reflux for two hours. Propionic acid formed during the reaction and any surplus propionic acid anhydride are removed by distillation, and the residual o-cresyl propionate remaining at 175° C. is subjected to the next step without further purification. (Where o-cresyl propionate is available, this step may be omitted.)

B. One and one-half mols of anhydrous aluminum chloride is dissolved in 400 milliliters of dry nitrobenzene in a suitable vessel provided with an efficient stirrer, and the system is cooled by an appropriate cooling bath to 20° C. The crude o-cresyl propionate from step A is then added gradually, and stirring is continued for two hours, during which time the temperature of the reaction is kept between 20° and 25° C. After this time the reaction vessel is equipped with an absorption tube to prevent ingress of moisture and allowed to stand at room temperature for 24 hours. Then the reaction mixture is gradually poured with constant stirring into three times its volume of 1% hydrochloric acid in ice water and the water-nitrobenzene system is allowed to stand until a good separation has taken place. The nitrobenzene layer, which contains m-methyl-p-hydroxypropiophenone and m-methyl-o-hydroxypropiophenone is drawn off, and the aqueous layer is extracted once with about one-half its volume of isopropyl ether. This ether extract is added to the nitrobenzene solution, which is then diluted with twice its volume of isopropyl ether. This solution is washed once with water and then extracted twice with an equal volume of 10% sodium hydroxide solution. This alkaline solution is washed once with one-fourth its volume of isopropyl ether, cooled to about 10° C., subjected to efficient agitation and gradually acidified with hydrochloric or sulfuric acid to Congo red. The crystalline product which thus precipitates is then filtered off, washed with distilled water until the washings are neutral to litmus, and dried.

C. The above solid material, consisting of approximately 80% of m-methyl-p-hydroxypropiophenone and about 20% of the o-hydroxy isomer, is placed in a 500 milliliter round-bottom flask provided with a reflux condenser, 1.05 mols of propionic acid anhydride is added, and the reaction mixture is refluxed for two hours. The material is then transferred to a suitable vacuum distilling flask and fractionally distilled. Fractions distilling below 140° C. at 21 millimeter Hg pressure are discarded. The unwanted o-propionoxy compound distills largely at 140 to 145° C., and 21 millimeter pressure, and the m-methyl-p-propionoxypropiophenone distills at 180–185° C., and 21 millimeter pressure. Thus, because of the wide divergency between the boiling points of the two isomers, separation is easily effected. Melting point of the m-methyl-p-propionoxypropiophenone is 50–52° C. The yield, based on 108 grams of starting o-cresol, is at least 80 grams.

By using other acid anhydrides or acid halides, other esters of m-methyl-p-hydroxypropiophenone may be prepared and isolated in a similar manner.

D. Sixty grams of oil-free aluminum foil is shaken for five minutes with 100 milliliters of 5% mercuric chloride solution in a 3 liter round-bottom flask. The mercuric chloride solution is then poured off and the aluminum foil is washed successively with water, methanol and isopropyl ether. Immediately after the last washing, the 80 grams of m-methyl-p-propionoxypropiophenone from the preceding step, dissolved in 800 milliliters of isopropyl ether, is added to the amalgamated aluminum. The flask is then provided with a sealed stirrer, a reflux condenser and a dropping funnel. While constantly stirring, water is allowed to enter the system slowly so that the temperature of the reaction mixture does not rise above 50° C. After 130 milliliters of water has been introduced over a period of about two hours, the stirring is continued until practically all of the amalgamated aluminum has been converted into aluminum hydroxide and mercury. About 800 milliliters of water is then added to the magma-like reaction mixture, the mass is well agitated, transferred to a separating funnel, and the upper ethereal layer separated. The aluminum hydroxide magma is washed once with about one-fourth its volume of isopropyl ether, and the ether solutions are combined and filtered. The combined solutions are subjected to low-temperature distillation to remove the isopropyl ether. The remaining viscous oil which contains the desired compound, 3,4-bis-(m-methyl-p-propionoxyphenyl)-3,4-hexanediol, is refrigerated to allow it to crystallize, or it can be used in its oily consistency for the next step. (When permitted to crystallize, and then recrystallized from ethanol, this compound has a melting point of 151–153° C.)

By using other esters of m-methyl-p-hydroxypropiophenone instead of propionate, other 3,4-bis-(m-methyl-p-acyloxyphenyl)-3,4-hexanediols can be readily prepared.

E. Eighty grams of the 3,4-bis-(m-methyl-p-propionoxyphenyl)-3,4-hexanediol, either in its oily consistency or in crystalline form, is placed in a 500 milliliter round-bottom flask along with 130 milliliters of acetic acid anhydride and 100 milliliters of acetyl chloride. The reaction mixture is gently refluxed for 30 minutes, allowed to cool, and then poured into twice its volume of water at 10° C. After allowing to stand with occasional stirring for one hour, the water is decanted and the residue is treated with 5% $Na_2CO_3$ solution until the mixture is rendered permanently alkaline. The aqueous solution is discarded, after which the residue is washed twice with water. Finally the semi-crystalline mass is triturated with ice cold methanol, and the resulting white crystalline material is filtered off, washed once more with cold methanol, again filtered and allowed to dry. Upon recrystallization, the 3,4-bis-(m-methyl-p-propionoxyphenyl)-2,4-hexadiene has a melting point of 139–140° C. The overall yield by this process, starting with 108 grams of o-cresol, is about 30 grams.

Administered orally to ovariectomized rats according to standard procedure, 15 gammas of 3,4-bis-(m-methyl-p-propionoxyphenyl)-2,4-hexadiene produces 83% estrus.

It will be obvious from the above example that a variety of esters, such as may be preferred as the estrogenic end product for use in the treatment of the menopausal syndrome, may be prepared in a like manner.

*Example 3*

A. Two grams of 3,4-bis-(m-methyl-p-propionoxyphenyl)-2,4-hexadiene is dissolved in 10 milliliters of Claisen solution and heated on the water bath until it has completely dissolved. After standing at room temperature for twenty-four hours, this solution is diluted with 40 milliliters of distilled water, filtered, and then gradually acidified with 10 per cent hydrochloric acid to Congo red. The precipitate is allowed to solidify, filtered off, washed with water and placed on porous tile to dry. After recrystallization from 50% ethanol the 3,4-bis-(m-methyl-p-hydroxyphenyl)-2,4-hexadiene melts at 187 to 189° C.

B. One gram of 3,4-bis-(m-methyl-p-hydroxyphenyl)-2,4-hexadiene is dissolved in 10 milliliters of anhydrous pyridine; 2.5 milliliters of butyric anhydride is added, and the mixture is refluxed gently for two and a half hours. After cooling, the reaction mixture is treated with water, and the solid which separates after a while is collected. The 3,4-bis-(m-methyl-p-butyroxyphenyl)-2,4-hexadiene thus obtained is washed with water and recrystallized from methanol; the melting point is 123 to 124° C.

Employing the above 3,4-bis-(m-methyl-p-hydroxyphenyl)-2,4-hexadiene, and by varying the molar ratios of phenolic compound and esterifying reagent, as well as using other acid halides or anhydrides, other esters including monoesters as well as diesters and mixed esters, may be prepared.

The monoesters may also be produced from the diesters by known half-saponification methods.

We have found that the estrogenic compounds provided as examples herein can be administered orally, without observable toxic effects, in doses which exceed many times their effective estrogenic doses. The estrogenic potencies of the compounds of this invention may be readily appreciated when it is recognized that, whereas oral administration of 50 gammas of estrone produces only about 70 per cent estrus in ovariectomized rats, one of the above compounds, for example, namely 3,4-bis-(m-methyl-p-propionoxyphenyl)-2,4-hexadiene, produces 83 per cent estrus in ovariectomized rats when given orally in 15 gamma doses. The estrogenic potency of the compounds of this invention is further demonstrated by the results of clinical experiments which disclose that the ordinary symptoms in the average menopausal patient are markedly alleviated through the oral administration of 5 milligrams of 3,4-bis-(m-methyl-p-acetoxyphenyl)-2,4-hexadiene per day.

It will be understood that the discussion of the estrogenic potency and the unusual freedom from toxicity of certain of the compounds of this invention is merely illustrative of the properties generally possessed by the other compounds specifically disclosed herein.

It will be understood further that the embodiments of our invention described in the specification and in the examples are only illustrative of the compounds and the processes by which they are produced. Various modifications can be made without departing from the principles of the invention or the scope of the invention which is defined in the claims.

We claim:

1. A new class of compounds, saturated monobasic unsubstituted aliphatic carboxylic acid esters of 3,4-bis-(m-methyl-p-hydroxyphenyl)-2,4-hexadiene containing 2 to 4 carbon atoms in the acyl radical.

2. A new compound, 3,4-bis-(m-methyl-p-acetoxyphenyl)-2,4-hexadiene.

3. A new compound, 3,4-bis-(m-methyl-p-propionoxyphenyl)-2,4-hexadiene.

4. A new compound, 3,4-bis-(m-methyl-p-butyroxyphenyl)-2,4-hexadiene.

VICTOR NIEDERL.
ALBERT BLOOM.

REFERENCES CITED

The following references are of record in the file of this patent:

FOREIGN PATENTS

| Number | Country | Date |
|---|---|---|
| 217,885 | Switzerland | Nov. 15, 1941 |